(12) United States Patent
Hoshiba

(10) Patent No.: US 7,468,565 B2
(45) Date of Patent: Dec. 23, 2008

(54) ELECTRICAL LOAD CONTROL DEVICE

(75) Inventor: Takeshi Hoshiba, Anjo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 142 days.

(21) Appl. No.: 11/659,570

(22) PCT Filed: Jan. 31, 2006

(86) PCT No.: PCT/JP2006/301944

§ 371 (c)(1),
(2), (4) Date: Feb. 7, 2007

(87) PCT Pub. No.: WO2006/082953

PCT Pub. Date: Aug. 10, 2006

(65) Prior Publication Data

US 2008/0143183 A1    Jun. 19, 2008

(30) Foreign Application Priority Data

Feb. 4, 2005 (JP) ............................. 2005-028534

(51) Int. Cl.
*B60L 1/00* (2006.01)
*H02J 3/38* (2006.01)
*B60Q 1/00* (2006.01)

(52) U.S. Cl. .................... 307/10.1; 307/18; 340/438

(58) Field of Classification Search ............... 307/10.1, 307/11; 340/438
See application file for complete search history.

(56) References Cited

U.S. PATENT DOCUMENTS 7,075,273 B2 * 7/2006 O'Gorman et al. ............ 322/28
2007/0262649 A1 * 11/2007 Ozawa et al. ................. 307/64

FOREIGN PATENT DOCUMENTS

| JP | A 6-46502 | 2/1994 |
| JP | A 7-274378 | 10/1995 |
| JP | A 2000-324615 | 11/2000 |
| JP | A 2004-72892 | 3/2004 |

\* cited by examiner

*Primary Examiner*—Michael J Sherry
*Assistant Examiner*—Michael Rutland Wallis
(74) *Attorney, Agent, or Firm*—Oliff & Berridge, PLC

(57) ABSTRACT

An ECU performs a program including a step of notifying a system main relay shut-off signal to a high-voltage system using equipment when a system main relay shut-off demand due to a HV system failure is generated, a step of shutting off the system main relay when a high voltage shut-off acknowledging signal from the high-voltage system using equipment is not unreceived, a step of shutting off the system main relay when a high voltage shut-off acknowledging signal from the high-voltage system using equipment is unreceived and a current value in a high voltage circuit is more than the predetermined threshold, and a step of shutting off the system main relay when the current value in the high voltage circuit is not more than the predetermined threshold and the predetermined period of time has elapsed from the occurrence of a HV system malfunction.

16 Claims, 2 Drawing Sheets

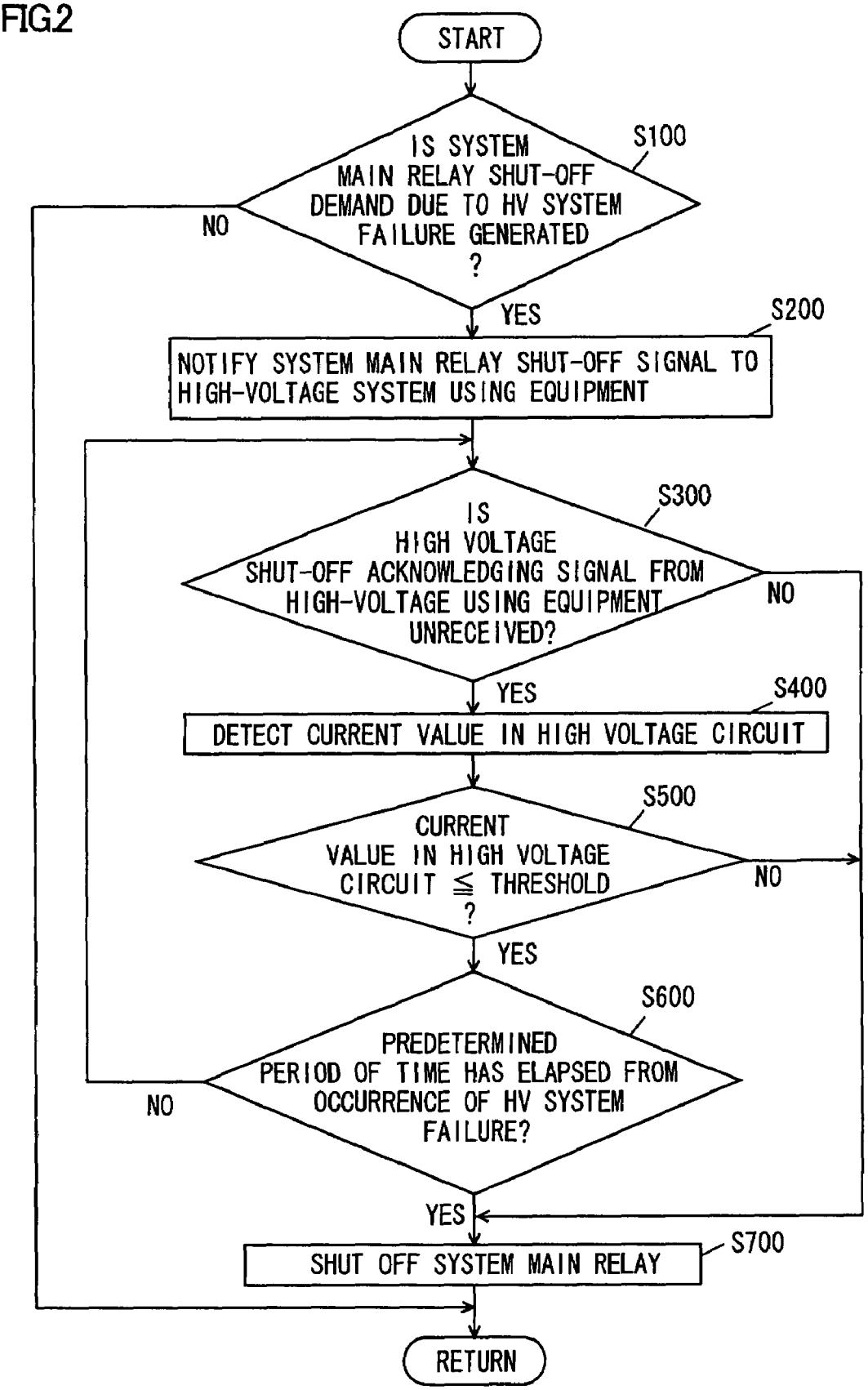

ELECTRICAL LOAD CONTROL DEVICE

TECHNICAL FIELD

The present invention relates to an electrical load control device supplying a power from an energy storage mechanism to a plurality of electrical loads, and particularly to a control device in the case where the power supplied to the loads is shut off.

BACKGROUND ART

There has been developed and has come into practical use a vehicle on which a powertrain, which is called a hybrid system wherein an engine (for example, a well known engine such as a gasoline engine or a diesel engine is considered to be used) and an electric motor are combined, is mounded. Such a vehicle is controlled so as to achieve the most efficient performance by automatically switching between operation by the engine and operation by the electric motor regardless of an accelerator operation amount by a driver. For example, in the case where the engine is operated in a steady state and operated for rotating a generator that charges a secondary battery (battery) acting as an energy storage mechanism, in the case where the engine is intermittently operated while the vehicle is running according to an amount of charge, or the like, the operation and stop of the engine are repeated regardless of the accelerator operation amount. In other words, the engine and the electric motor are separately operated or cooperatively operated, thereby enabling the improvement in fuel consumption and the great suppression of exhaust gas.

As this secondary battery, a high-voltage nickel hydride battery or the like is used for supplying power to the electric motor. Additionally, such a vehicle mounted with the hybrid system is provided with a DC/DC converter for charging an auxiliary battery or an EPS (Electric Power Steering) that receives a supply of the power from this secondary battery, instead of receiving a supply of the power from a conventional auxiliary battery. In other words, such a vehicle is mounted with a plurality of high voltage electrical equipment, to which the power from the high voltage secondary battery is supplied.

Japanese Patent Laying-Open No. 2004-72892 discloses an electrical load driving device capable of operating a part of a plurality of electrical loads even when a different part of the plurality of electrical loads is out of control. This electrical load driving device includes a power source that outputs a DC voltage, a voltage converter that changes a voltage level of the DC voltage to output an output voltage, a first electrical load that is driven by the output voltage outputted from the voltage converter, a second electrical load connected between the power source and the voltage converter, and control means for stopping the voltage converter when a malfunction occurs in the first electrical load.

According to this electrical load driving device, the driving device includes the control means that controls so as to stop a boost converter (voltage converter) that supplies the DC voltage to an inverter driving an AC motor and to continue to supply a DC voltage of the DC power source to an auxiliary system (second electrical load), for example when the AC motor as the first electrical load is out of control and a charging amount of the DC power source reaches full charging amount. Accordingly, even if the main electrical load is out of control, the other electrical load can be operated without interruption.

In Japanese Patent Laying-Open No. 2004-72892 described above, however, the boost converter is stopped and the supply of the power to the auxiliary system is maintained while continuing on an ON state of a system main relay, assuming the case where the control of stopping the boost converter can not be performed, it is necessary to protect the system by shutting off the system main relay. Thus, the shutting off the system main relay causes the stop of the power supply to the electrical load. At this time, when the power supply to the electrical load is stopped, the actuation of the electrical load (for example, EPS) is abruptly stopped. In such a case, a driver feels uncomfortable.

DISCLOSURE OF THE INVENTION

The present invention has been conceived to solve the above-described problem, and an object of the invention is to provide an electrical load control device that supplies power to a plurality of electrical loads without causing a problem at a time of shutting off the power supply to the electrical loads.

The electrical load control device according to this invention is for controlling a plurality of electrical loads, to which a power is supplied from an energy storage mechanism mounted on a vehicle. This control device includes a detection unit that detects a power shut-off demand to a first electrical load, a transmission unit that transmits a power shut-off warning signal to a second electrical load, a reception unit for receiving, from the second electrical load, information indicating that the second electrical load is in a power shut-off permitting state in response to the warning signal, and a control unit that controls a relay to bring the energy storage mechanism and the electrical loads into one of a connection state and a shut-off state based on the reception of the information.

According to this invention, a power is supplied from a secondary battery, for example, such as a nickel hydride battery, one example of the energy storage mechanism mounted on a hybrid vehicle running with an engine and an electric motor, to a traction motor (more specifically, from the secondary battery to the traction motor via a boost converter and an inverter in many cases). When a malfunction occurs in the first electrical load of a running system constituted by the traction motor, the boost converter and the inverter, the power supply from the secondary battery has to be shut off in order to avoid unstable behavior of the traction motor. In the case where there exists the second electrical load that receives the power supply from this secondary battery, however, when the power supply is shut off promptly in response to the shut-off demand based on the malfunction of the first electrical load or the like, a device such as an EPS activated by the second electrical load abruptly stops normal actuation. In this manner, a measure is taken against the shut-off of the power supply from the second battery, by transmitting the power shut-off warning signal to the second electrical load so that the EPS or the like changes the power supply source to a backup power source or an amount of electric-motor assist is gradually decreased before the power to the second electrical load is shut off. Then, the second electrical load transmits, to the control device, the information indicating that the second electrical load is in the power shut-off permitting state. Upon receiving this information, the control unit controls the relay so as to bring the energy storage mechanism and the electrical loads including the second electrical load into the shut-off state. Thereby, a problem in the second electrical load caused by prompt shut-off of the power supply can be suppressed. As a result, it is possible to provide the electrical load control device that supplies the power to the plurality of electrical loads without causing a problem at the time of shutting off the power supply to the electrical loads.

Upon receiving the information from the second electrical load, the control unit preferably brings the relay from the connection state into the shut-off state.

According to this invention, a process is taken such that the problem does not occur even if the power supply to the second electrical load is shut off, and then the information indicating that the second electrical load is in the power shut-off permitting state is transmitted to the electrical load control device. After this, the control unit controls the relay so as to bring the energy storage mechanism and the electrical loads into the shut-off state, and therefore the problem caused by the prompt shut-off of the power supply to the electrical loads is suppressed.

More preferably, the electrical load control device further includes a current detection unit that detects a current value of the power supplied from the energy storage mechanism to the electrical loads. Even in the case where the information from the second electrical load is not received, if a current value is not less than a predetermined value, the control unit brings the relay from the connection state into the shut-off state.

According to this invention, it is assumed the case where the information indicating that the second electrical load is in the power shut-off permitting state can not be received, after the process is taken such that the problem does not occur even if the power supply the second electrical load is shut off to. In such a case, if the current value of the power supplied from the secondary battery is not low, unstable behavior of the traction motor may occur. Therefore, even in the case where the information from the second electrical load is not received, if the current value is not less than the predetermined value, the relay is brought into the shut-off state, thereby the problem in the first electrical load can be prevented from occurring.

More preferably, the detection unit detects the power shut-off demand based on the occurrence of the malfunction in the first electrical load.

According to this invention, when the malfunction occurs in the first electrical load of the running system constituted by the traction motor, the boost converter and the inverter, the power shut-off demand can be detected.

More preferably, even in the case where the information from the second electrical load is not received, when a predetermined period of time has elapsed from the occurrence of the malfunction, the control unit brings the relay from the connection state into the shut-off state.

According to this invention, it is assumed the case where the information indicating that the second electrical load is in the power shut-off permitting state can not be received, after the process is taken such that the problem does not occur even if the power supply to the second electrical load is shut off. In such a case, the continuous connection state of the relay under the state that the malfunction occurs in the running system causes a possibility of further expanding a malfunction in the running system, inducing a secondary failure, or generating unstable behavior of the traction motor. For this reason, in order to prevent the occurrence of such problems, the power supply is shut off even if the relay is shut off. Therefore, even in the case where the information from the second electrical load is not received, when the predetermined period of time has elapsed from the occurrence of the malfunction, the relay is brought into the shut-off state, whereby it is possible to prevent the occurrence of a new problem.

More preferably, the energy storage mechanism is a secondary battery.

The power supply from the secondary battery as the storage mechanism can be shut off without causing a problem in the electrical equipment.

More preferably, the first electrical load is an electrical load of a running system.

In the case where a malfunction occurs in the electrical load of the running system constituted by the traction motor, the boost converter and the inverter, the power supply can be shut off without causing a problem in the second electrical equipment.

More preferably, the second electrical load is an electrical load of an auxiliary system.

In the case where a malfunction occurs in the first electrical load, it is possible to shut off the power supply without causing a problem in an auxiliary system as the second electrical equipment such as an EPS, an electric compressor of an air conditioner, a DC/CD converter charging an auxiliary battery, or the like.

BRIEF DESCRIPTION OF THE DRAWINGS

FIG. 2 is a flowchart showing a control structure of an malfunction determining program performed in an ECU of FIG. 1.

BEST MODES FOR CARRYING OUT THE INVENTION

Figure 1:
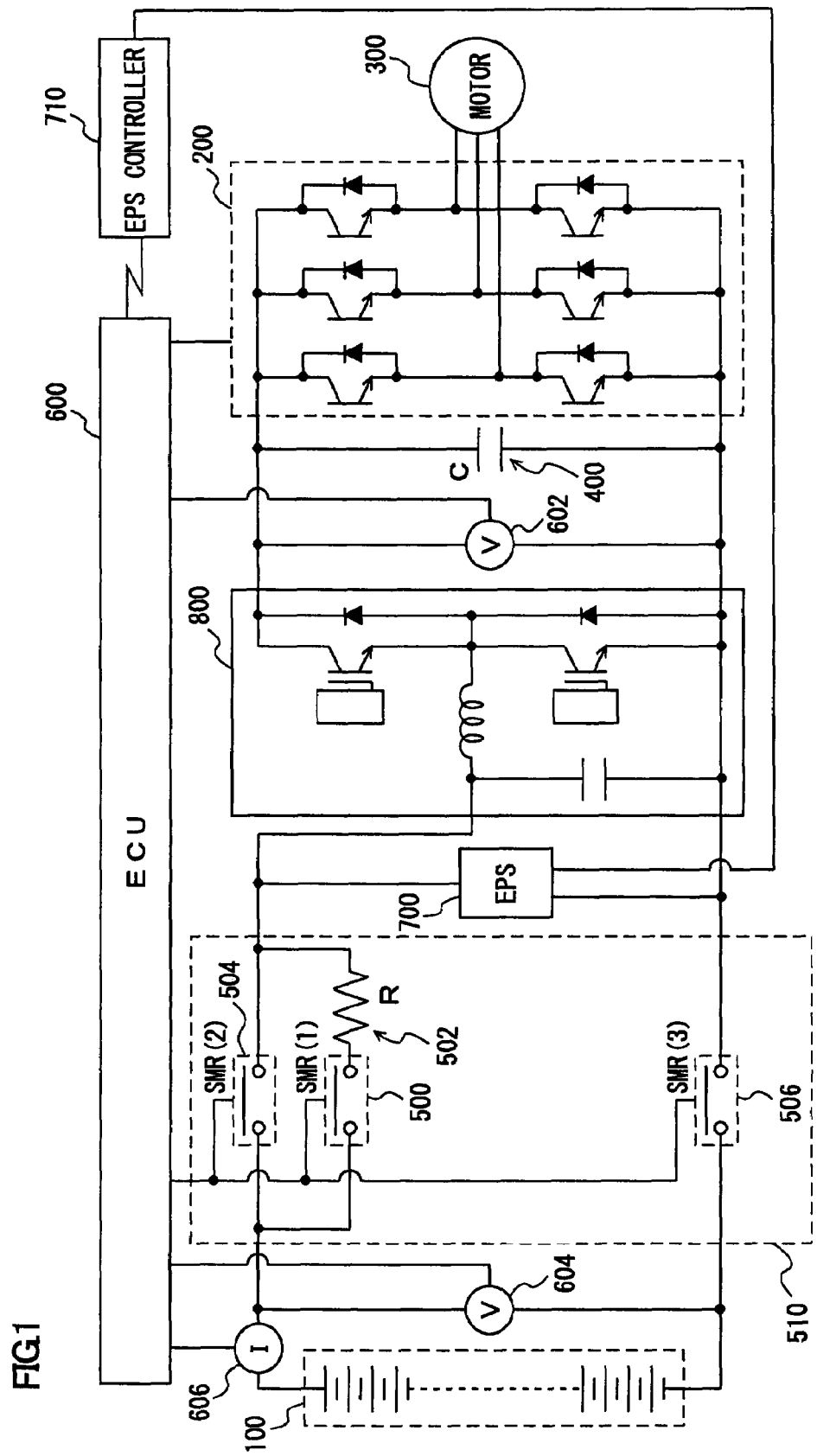
FIG. 1 is a view showing an entire structure of a vehicle mounted on a control device of a power circuit according to an embodiment of the present invention.

An embodiment of the present invention will be hereinafter described with reference to the drawings. In the following description, the same reference numerals are given to the same parts and these names and functions are also the same. Accordingly, the detailed description thereof will not be repeated.

With reference to FIG. 1, a description will be given of a vehicle mounted with a control device according to an embodiment of the present invention. This vehicle includes a battery 100, an inverter 200, a traction motor 300, a condenser 400, a system main relay 510 (SMR (1) 500, limiting resistor 502, SMR (2) 504, SMR (3) 506), and an ECU (Electronic Control Unit) 600. The control device according to the embodiment is realized by a program preformed by ECU 600. In this embodiment, the description is given of the vehicle that is an electric vehicle running only by a driving force from traction motor 300. However, the vehicle mounted with the electrical load control device according to the present invention is not limited to the electric vehicle, and the control device can be mounted on other vehicle such as a hybrid vehicle or a fuel-cell vehicle.

Battery 100 is an assembled battery in which a plurality of modules, each of which includes a plurality of cells connected in series, are connected in series. A capacitor can be used in place of battery 100.

Inverter 200 includes six IGBTs (Insulated Gate Bipolar Transistor) and six diodes, each of which is connected in parallel to the each IGBT so as to flow a current from an emitter side to a collector side of the IGBT. Inverter 200 switches a gate of the each IGBT on/off (supplies/shuts off an electric current) based on a control signal from ECU 600, thereby a current supplied from battery 100 is converted from an AC current to a DC current to supply the DC current to traction motor 300. A further detailed description is not repeated here, since well known technique can be applied to inverter 200 and the IGBT.

Traction motor 300 is a three-phase motor. A rotating shaft of traction motor 300 is finally connected to a drive shaft (not shown) of the vehicle. The vehicle runs with a driving force from traction motor 300.

Condenser 400 is connected to inverter 200 in parallel. Condenser 400 stores a load once so as to smooth a power supplied from battery 100 or a power supplied from inverter 200. The smoothed power is supplied to inverter 200 or battery 100.

System main relay 510 is constituted by SMR (1) 500 and SMR (2) 504 on a positive electrode side, and SMR (3) 506 on a negative electrode side. SMR (1) 500 and SMR (2)504 are provided on a positive electrode side of battery 100. SMR (1) 500 and SMR (2) 504 are connected in parallel. Limiting resistor 502 is connected in series to SMR (1) 500. SMR (1) 500 is an SMR for precharge that is connected before SMR (2) 504 is connected so that an inrush current is prevented from flowing in inverter 200. SMR (2) 504 is an SMR on a positive side that is connected after SMR (1) 500 is connected and the precharge is completed. SMR (3) 506 is an SMR on a negative side that is provided on the negative electrode side of battery 100. Each of the SMRs is controlled by ECU 600.

ECU 600 performs a program stored in a ROM (Read Only Memory), based on an ignition switch (not shown), a pressing amount of an accelerator pedal (not shown), a pressing amount of a brake pedal (not shown) or the like, and controls inverter 200 and the each SMR, thereby enabling the vehicle to run in a desired condition. A voltmeter 602 that detects a voltage of condenser 400 is connected to ECU 600. A voltage V (1) of inverter 200 (traction motor 300) is detected by detecting the voltage of condenser 400.

In addition, a voltmeter 604 that detects a voltage V (B) of battery 100 and an ammeter 606 that detects a current I (B) of battery 100 are connected to ECU 600.

SMR (1) 500, SMR (2) 504 and SMR (3) 506 are a relay that closes a point of contact to brought into an ON state when an exciting current is supplied to a coil. A description will be given of the relationship of the operation state of SMR (1) 500, SMR (2) 504 and SMR (3) 506 and the position of the ignition switch. The ignition switch has OFF position, ACC position, ON position and STA (start) position. When a power source is shut off, that is to say, when the ignition switch is positioned in the OFF position, ECU 600 brings all of SMR (1) 500, SMR (2) 504 and SMR (3) 506 into an OFF state. In other words, ECU 600 brings the exciting current to the coil of each SMR (1) 500, SMR (2) 504 and SMR (3) 506 into an OFF state. When an engine key is inserted into a key cylinder and then is turned, the position of the ignition switch is switched to the OFF position, the ACC position, the IGON position and the STA position, in that order, and is automatically returned from the STA position to the ON position. The ignition switch is not limited to thus described ignition switch, and the following may be adopted. When a key in place of the engine key (also referred to as a smart entry key) is inserted into a key slot (or a driver carries the smart entry key and sits in a driver's seat) and a push button switch (also referred to as a power switch) is pushed, the position of a power source is switched to an OFF position, an ACC position, an IGON position and an HV system starting position, in that order.

In addition, this vehicle is provided with an EPS 700, to which a power is supplied from battery 100 and which assists steering operation with the electric motor, and an EPS controller 710 that is a control device of EPS 700. For example, when a rated voltage of battery 100 is about 200 V, EPS 700 reduces a voltage to about 42 V with a built-in DC/DC converter, thereby a power is supplied to an EPS motor. An electrical load, to which a power is supplied from battery 100, may be a DC/DC converter that charges a low voltage battery (auxiliary battery).

This vehicle also includes a boost converter 800 provided between battery 100 and inverter 200. Boost converter 800 boosts the rated voltage of battery 100, for example, from about 200 V to about 500 V (a rated voltage of a motor). Boost converter 800 is constituted by two IGBTs or a reactor that reduces current variation.

At the time of connecting the power source, that is, when the position of the ignition switch is switched from the OFF position to the STA position through the ACC position and the ON position, ECU 600 firstly brings SMR (3) 506 into an ON state, and then brings SMR (1) 500 into an ON state to perform precharge. Since limiting resistor 502 is connected to SMR (1) 500, an inverter voltage V (I) slowly rises even if SMR (1) 500 is brought into the ON state, thereby the occurrence of an inrush current can be prevented. When the position of the ignition switch is switched from the OFF position to the ON position, a malfunction determining process described later is performed. It is to be noted that the malfunction determining process may be performed when the position of the ignition switch is switched from the OFF position to the ACC position.

When inverter voltage V (I) reaches, for example, about 80% of a battery voltage V (B), ECU 600 completes precharge and then brings SMR (2) 504 into an ON state. When inverter voltage V (I) approximately equals the battery voltage V (B), ECU 600 brings SMR (1) 500 into an OFF state and a current supply from battery 100 is brought into an ON state.

In the meantime, when the position of the ignition switch is switched from the ON position to the OFF position, ECU 600 firstly brings SMR (2) 504 into an OFF state and subsequently brings SMR (3) 506 into an OFF state. As a result, electrical connection between battery 100 and inverter 200 is shut off to be brought into a power source shut-off state. At this time, a remaining voltage on a drive circuit is discharged, and inverter voltage V (I) is gradually converges to about 0 V (voltage at the time of shut-off). It is to be noted that the voltage at the time of the shut-off is not necessarily 0 V, and may be a weal voltage, for example, about 2 or 3 V.

While ECU 600 thus brings system main relay 510 from the ON state to the OFF state, ECU 600 further performs control peculiar to the present invention as described below, when bringing system main relay 510 into the OFF state.

With reference to FIG. 2, a description will be given of a control structure of a program performed by ECU 600 serving as the electrical load control device according to the embodiment. It is to be noted that a program represented by the following flowchart is repeatedly performed at predetermined time intervals.

In Step (hereinafter, abbreviated step as S)100, ECU 600 determines whether or not a shut-off demand of system main relay 510 due to a HV system failure is generated. At this time, ECU 600 detects that the system main relay shut-off demand due to the HV system failure is generated, for example when a malfunction occurs in battery 100 based on information of voltmeter 604 of battery 100 inputted from ammeter 606. ECU 600 may also determine that the system main relay shut-off demand due to the HV system failure is generated based on a malfunction detecting signal inputted from Inverter 200 or boost converter 800. When the system main relay shut-off demand due to the HV system failure is generated (YES in S100), the process proceeds to S200. If not (NO in S100), the process is terminated.

In S200, ECU 600 notifies a system main relay shut-off signal to a high-voltage system using equipment. At this time, ECU 600 notifies the system main relay shut-off signal to, for example, EPS controller 710.

In S300, ECU 600 determines whether or not a high voltage shut-off acknowledging signal from the high-voltage system using equipment is unreceived. When the high voltage shut-off acknowledging signal from the high-voltage system using equipment is unreceived (YES in S300), the process proceeds to S400. If not (NO in S 300), the process proceeds to S700.

In S400, ECU 600 detects a current value in a high voltage circuit. At this time, ECU 600 detects the current value in the high voltage circuit based on a signal inputted from ammeter 606.

In S500, ECU 600 determines whether or not the current value in the high voltage circuit is not more than a predetermined threshold. When the current value in the high voltage circuit is not more than the predetermined threshold (YES in S500), the process proceeds to S600. If not (NO in S500), the process proceeds to S700.

In S600, ECU 600 determines whether or not a predetermined period of time has elapsed from the occurrence of the HV system failure. When the predetermined period of time has elapsed from the occurrence of the HV system failure (YES in S600), the process proceeds to S700. If not (NO in S600), the process is returned to S300, and the processes in S300 to S500 are repeatedly performed.

In S700, ECU 600 brings the system main relay 510 into a shut-off state. The specific method for bringing the system main relay 510 into the shut-off state is that as previously described.

A description will be given of the operation of an electrical load circuit controlled by ECU 600 serving as the electrical load control device according to the embodiment and based on the above-described structure and flowchart.

When the system main relay 510 is brought into a connection state, a power is supplied from battery 100 to inverter 200 via boost converter 800, or a power is supplied from battery to EPS 700. When a malfunction in battery 100 is detected, a malfunction in boost converter 800 is detected, a malfunction in inverter 200 is detected, or a malfunction in motor 300 is detected, a demand for shutting off the system main relay 510 is generated (YES in S100). The system main relay shut-off signal is notified to boost converter 800, inverter 200, or EPS 700 and the like as the high-voltage system using equipment (S200).

EPS controller 710 receiving this system main relay shut-off signal performs a process for switching a power supply circuit supplied to EPS 700 from a main power supply circuit to a backup circuit supplied via a low voltage battery. In addition, ESP controller 710 controls EPS 700 such that EPS 700 gradually reduces an assist amount of an electric power steering. After that, EPS controller 710 transmits the high voltage shut-off acknowledging signal to ECU 600.

When all the high voltage shut-off acknowledging signals from the high-voltage system using equipment are received (NO in S300), the system main relay 510 is shut off (S700).

On the other hand, when the high voltage shut-off acknowledging signal from the high-voltage using equipment is unreceived (YES in S300) and the current value in the high voltage circuit is more than the predetermined threshold (NO in S500), the system main relay 510 is shut off (S700), In addition, when the current value in the high voltage circuit is not more than the predetermined threshold (YES in S500) and the predetermined period of time has elapsed from the occurrence of the HV system failure (YES in S600), the system main relay is shut off (S700).

As described above, when the system main relay has to be shut off due to the failure of the HV system, a warning signal of performing the shut-off of the system main relay is notified in advance to the equipment using the high voltage system by a program performed by the ECU as the electrical load control device according to the embodiment. Even if the high voltage system is shut off, the high-voltage system using equipment that has received the notification of the shut-off warning signal of the system main relay transmits the high voltage shut-off acknowledging signal to the ECU after performing a process for preventing the occurrence of the problem caused by the shut-off. In the ECU, when the high voltage shut-off acknowledging signal from the high voltage system using equipment is received, the main relay is shut off. Accordingly, a new problem does not occur, since the high voltage power is shut off the high-voltage system using equipment. Even in the case where the current value in the high voltage circuit is not more than the predetermined threshold and the predetermined period of time has elapsed from the occurrence of the HV system failure, the system main relay is shut off. This is because, if the power from the battery is not actually consumed, for example, unstable behavior of the traction motor does not occur. Therefore, when predetermined period of time has elapsed, the system main rely is shut off. In addition, in the case where the current value in the high voltage circuit is not more than the predetermined threshold, since the power from the battery is consumed, there is a possibility of the occurrence of unstable behavior of the motor. Therefore, even if the high voltage shut-off acknowledging signal from the high voltage system using equipment is not received, the system main relay is shut off.

The embodiment disclosed herein is to be considered in all respects as illustrative and not restrictive. The scope of the invention is indicated by the claims rather than the foregoing description and all changes that come within the meaning and range of equivalency of the claims are intended to be embraced therein.

The invention claimed is:

1. An electrical load control device for controlling a plurality of electrical loads, to which a power is supplied from an energy storage mechanism mounted on a vehicle, the electrical load control device comprising:
   a detection unit that detects a power shut-off demand to said first electrical load;
   a transmission unit that transmits a power shut-off warning signal to said second electrical load;
   a reception unit that receives, from said second electrical load, information indicating that said second electrical load is in a power shut-off permitting state in response to the transmission of said warning signal; and
   a control unit that controls a relay to bring said energy storage mechanism and said electrical loads into one of a connection state and a shut-off state based on the reception of said information.

2. The electrical load control device according to claim 1, wherein said control unit brings said relay from a connection state into a shut-off state, upon receiving said information from said second electrical load.

3. The electrical load control device according to claim 1, further comprising a current detection unit that detects a current value of the power supplied from said energy storage mechanism to said electrical loads,
   wherein even in a case where said information is not received from said second electrical load, when said current value is not less than a predetermined value, said control unit brings said relay from a connection state into a shut-off state.

4. The electrical load control device according to claim 1, wherein said detection unit detects said power shut-off demand based on occurrence of a malfunction in said first electrical load.

5. The electrical load control device according to claim 4, wherein even in a case where said information is not received from said second electrical load, when a predetermined period of time has elapsed from the occurrence of said malfunction, said control unit brings said relay from a connection state into a shut-off state.

6. The electrical load control device according to claim 1, wherein said energy storage mechanism is a secondary battery.

7. The electrical load control device according to claim 1, wherein said first electrical load is an electrical load of a running system.

8. The electrical load control device according to claim 1, wherein said second electrical load is an electrical load of an auxiliary system.

9. An electrical load control device for controlling a plurality of electrical loads, to which a power is supplied from en energy storage mechanism mounted on a vehicle, the electrical load control device comprising:
   detection means for detecting a power shut-off demand to said first electrical load;
   transmission means for transmitting a power shut-off warning signal to said second electrical load;
   reception means for receiving, from said second electrical load, information indicating that said second electrical load is in a power shut-off permitting state in response to the transmission of said warning signal; and
   control means for controlling a relay to bring said energy storage mechanism and the electrical loads into one of a connection state and a shut-off state based on the reception of said information.

10. The electrical load control device according to claim 9, wherein said control means includes means for bringing said relay from a connection state into a shut-off state, upon receiving said information from said second electrical load.

11. The electrical load control device according to claim 9, further comprising means for detecting a current value of the power supplied from said energy storage mechanism to said electrical loads,
   wherein said control means includes means for bringing said relay from a connection state into a shut-off state, when said current value is not less than a predetermined value, even in a case where said information from said second electrical load is not received.

12. The electrical load control device according to claim 9, wherein said detection means includes means for detecting said power shut-off demand based on occurrence of a malfunction in said first electrical load.

13. The electrical load control device according to claim 12, wherein said control means includes means for bringing said relay from a connection state into a shut-off state, when a predetermined period of time has elapsed from the occurrence of said malfunction, even in a case where said information from said second electrical load is not received.

14. The electrical load control device according to claim 9, wherein said energy storage mechanism is a secondary battery.

15. The electrical load control device according to claim 9, wherein said first electrical load is an electrical load of a running system.

16. The electrical load control device according to claim 9, wherein said second electrical load is an electrical load of an auxiliary system.

* * * * *